United States Patent
Taczak, Jr.

[15] 3,699,339
[45] Oct. 17, 1972

[54] TWO-COLOR RADIOMETER

[72] Inventor: William J. Taczak, Jr., Fredericksburg, Va.

[73] Assignee: The United States of America as represented by the Secretary of the Navy

[22] Filed: April 7, 1971

[21] Appl. No.: 132,036

[52] U.S. Cl. ............................................. 250/83.3 H
[51] Int. Cl. ............................................. G01t 1/16
[58] Field of Search ............... 250/83.3 H; 356/81, 82

[56] References Cited

UNITED STATES PATENTS

| 3,204,100 | 8/1965 | Wormser et al. ...... 250/83.3 H |
| 3,391,279 | 7/1968 | Detrio .................. 250/83.3 H |

Primary Examiner—James W. Lawrence
Assistant Examiner—Davis L. Willis
Attorney—R. S. Sciascia and Thomas O. Watson, Jr.

[57] ABSTRACT

The inventive radiometer is capable of measuring the radiant energy of a target or of an event, including a transient event, in two spectral regions with identical fields of view. The invention may be used for target identification or for discriminating against false targets, such as solar radiation.

8 Claims, 1 Drawing Figure

PATENTED OCT 17 1972          3,699,339
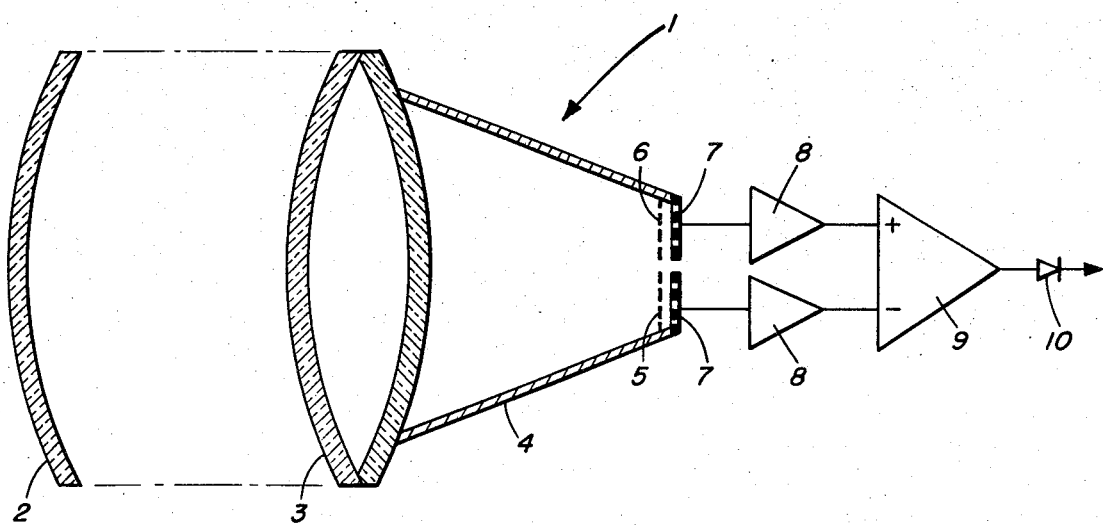
INVENTOR.
WILLIAM J. TACZAK, JR.
BY Thomas O. Watson Jr.
ATTORNEY

TWO-COLOR RADIOMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A. Field of the Invention

The present invention relates generally to devices for detecting and measuring radiant energy and more particularly to devices that are capable of detecting and measuring radiant energy of an event simultaneously in two spectral regions with identical fields of view.

B. Description of the Prior Art

Two-color radiometric systems have been used to distinguish a radiating target from false targets, especially in the infrared spectrum, in the prior art. In some systems, two complete units are used, one for each "color." These are usually quite cumbersome and complex devices; and in most cases, the fields of view are not identical. A number of these two-color units are encased in the same housing and view the same angular field. A rotating chopper blade alternates the incident radiant energy in regular intervals between the two detectors. Obviously, this type of device cannot be used to measure a transient event since the output signals of the two detectors do not correspond in time.

SUMMARY OF THE INVENTION

The inventive radiometer is capable of measuring the radiant energy of an event, especially a transient event, in two spectral regions with identical fields of view. The inventive radiometer may also be used to identify targets and to discriminate against false targets such as solar radiation. These functions are accomplished in the inventive system by providing a collector lens to collect the incident radiant energy and to focus it to an image of the source. A doublet lens is placed at the focus of the collector lens to transfer the radiation to a highly-reflective conical shield that receives the transferred radiant energy and scrambles and spreads the radiant energy evenly over the surfaces of two detectors. Spectral filters are provided for each detector to transmit radiant energy in the spectral regions of interest. The outputs from the detector are fed to a differential amplifier and from there through a diode. The inventive system discriminates against solar radiation, while detecting "true" targets.

OBJECTS OF THE INVENTION

An object of the present invention is the provision of a simple system to detect and measure the radiant energy of an event.

Another object of the invention is to provide a system capable of measuring the radiant energy of an event, especially a transient event, in two spectral regions with identical fields of view.

A further object of the invention is the provision of a system that discriminates against false targets, such as solar radiation, while detecting and making possible identification of true targets.

Other objects, advantages and novel features of the present invention will become apparent from the following detailed description of the invention when considered in conjunction with the accompanying drawings.

BRIEF DESCRIPTION OF THE DRAWINGS

The FIGURE illustrates a preferred embodiment of the inventive two-color radiometer.

DESCRIPTION OF THE PREFERRED EMBODIMENT

The FIGURE illustrates a preferred embodiment of the inventive two-color radiometer. The two-color radio-meter 1 comprises a collector lens 2 for collecting the incident radiant energy and for focusing the radiant energy to an image of the source. The field doublet lens 3 is placed at the focus of the collector lens and transfers the incident radiant energy to a highly reflective conical shield 4 that acts as a light and radiant energy scrambler and spreads the radiation over the surface of the two radiant energy detectors 7. The spectral filters 5 and 6 are selected to transmit radiation in the two spectral regions of interest. The choice of detectors 7 depends upon the spectral regions of interest and may or may not be of the same material. An electrical signal representative of the incident radiant energy passes from the detectors 7 through preamplifiers 8 to differential amplifier 9. From the differential amplifier 9, the resultant signal passes through diode 10.

A specific embodiment of the instant invention will now be described that can be used to detect radiation from a source which can be characterized as a black-body radiator radiating from 800° to 1,300° K and which can discriminate against solar radiation. A germanium collector lens 2 acts as a 1.8 micrometer long-pass filter. A germanium field doublet lens 3 is positioned at the focus of the germanium collector lens 2 and transfers the incident radiant energy to the conical shield 4 which scrambles the light and incident radiant energy and spreads this evenly over the surface of the two detectors 7. The two detectors 7 are lead sulfide detectors and are identical having equal areas accepting radiation. Spectral filter 5 is designed to transmit radiation in the spectral band from 1.8 to 2.1 micrometers. Spectral filter 6 is designed to transmit radiation in the spectral band from 2.2 to 2.5 micrometers. The preamplifiers 8 are identical and have the same gain setting. The resultant signals from the lead sulfide detectors 7 and preamplifiers 8 are fed into a differential amplifier 9 for comparison. If the incident radiant energy is solar radiation, it can be shown from Planck's black-body equations that there will be more radiation in the 1.8 to 2.1 micrometer region than in the 2.2 to 2.5 micrometer region. Thus, the output signal from the differential amplifier will be negative. However, the diode 10 will block a negative signal; thus, the system will not permit an output signal representative of solar radiation. A black-body radiator between 800° and 1300° K has more radiation than the 2.2 to 2.5 micrometer band region then the 1.8 to 2.1 micrometer band region. Thus, the differential amplified output from a signal representative of this type of radiation will be positive; and the diode 10 will permit the signal to pass, denoting a true source.

Thus, it is seen that the inventive system is capable of discriminating against solar radiation while detecting a "hot" source, such as a fire. It is also a "staring" system that has no moving parts which considerably improves the reliability and lessens the maintenance of the system. The two detectors 7 are capable of measuring radiation simultaneously in time and with identical fields of view. The specific embodiment illustrated in the FIGURE can operate at ambient temperature and requires no cooling. An important feature of the inventive system is that the power density and the spectral content of the incident radiant energy impinging on the spectral filters are the same because the highly reflective conical shield 4 scrambles the incident light and radiant energy and spreads it evenly over the spectral filters 5 and 6. Thus, it is seen that a rather simple, highly reliable system is provided for identifying true targets and discriminating against false targets, such as solar radiation.

Obviously, many modifications and variations of the present invention are possible in light of the above teaching. It is therefore to be understood that, within the scope of the appended claims, the invention may be practiced otherwise than as specifically described.

What is claimed is:

1. A new and improved two-color radiometer comprising:
 a germanium collector lens for collecting and transmitting incident radiant energy of a wavelength equal to or greater than 1.8 micrometers and for focusing this radiant energy to an image of its source;
 a germanium field doublet lens located at the focus of the collector lens for transferring the transmitted radiant energy;
 two identical lead sulfide detectors capable of emitting an electrical signal responsive to the received radiant energy;
 a highly-reflective conical shield capable of scrambling light and other incident radiant energy and of spreading the incident radiant energy over the surface of the two detectors;
 two spectral filters for transmitting radiant energy to each of the detectors, one of said filters capable of transmitting radiant energy in the 1.8 to 2.1 micrometer region to one of said detectors and the other of said filters capable of transmitting radiant energy in the 2.2 to 2.5 micrometer region to the other of said detectors;
 an amplifier electrically connected to each of said detectors for amplifying the resultant electrical signal from said detectors;
 a differential amplifier for receiving the amplified electrical signals from each of said detectors; and
 a diode capable of transmitting an electrical signal when the detected radiant energy lies primarily in the 2.2 to 2.5 micrometer region and capable of blocking the transmission of an electrical signal when the detected radiant energy lies primarily in the 1.8 to 2.1 micrometer region.

2. A new and improved radiometer comprising:
 means for detecting and measuring the radiant energy of an event in plural spectral regions with identical fields of view; and
 means for discriminating against undesired sources of radiant energy;
 wherein said detecting and measuring means comprises:
 means for collecting incident radiant energy and focusing the incident radiant energy to an image of the source;
 means located at the focus of the collecting means for transferring the incident radiant energy;
 plural means for emitting electrical signals in response to the impingment thereon of radiant energy;
 means for receiving the transferred radiant energy and for scrambling and spreading the transferred radiant energy evenly over the surface of the plural responsive means; and
 plural means for receiving the radiant energy from the scrambling and spreading means and for transmitting to the responsive means only that radiant energy that lies in plural distinct spectral regions of interest, each of said transmitting means transmitting a different radiant energy 3. A device as recited in claim 2 further comprising amplifying means for amplifying the electrical signals from the responsive means and means for transmitting an electrical signal upon the detection of a desired source of radiant energy and for blocking the transmission of an electrical signal upon the detection of radiant energy from an undesired source.

4. A device as recited in claim 2 in which the collecting means is a germanium collector lens capable of acting as a 1.8 micrometer long-pass filter.

5. A device as recited in claim 2 in which the means for transmitting radiant energy in plural spectral regions of interest comprises two spectral filters, one capable of transmitting radiant energy in the 1.8 to 2.1 micrometer region and the other capable of transmitting radiant energy in the 2.2 to 2.5 micrometer region.

6. A device as recited in claim 2 in which the responsive means comprises two identical lead sulfide detectors with equal areas for excepting radiant energy.

7. A device as recited in claim 2 in which the means for transmitting and for blocking an electrical signal comprises a differential amplifier and a diode.

8. A device as recited in claim 2 in which the scrambling and spreading means comprises a highly reflective conical shield.

* * * * *